(12) United States Patent
Harvey (10) Patent No.: US 10,955,045 B2
(45) Date of Patent: Mar. 23, 2021

(54) PLANET CARRIER AND METHOD OF ASSEMBLING OF A PLANET CARRIER

(71) Applicant: ROLLS-ROYCE plc, London (GB)

(72) Inventor: Giles E Harvey, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/702,716

(22) Filed: Dec. 4, 2019

(65) Prior Publication Data

US 2020/0191257 A1 Jun. 18, 2020

(30) Foreign Application Priority Data

Dec. 14, 2018 (GB) ..................................... 1820399

(51) Int. Cl.
*F16H 57/08* (2006.01)
*F02C 7/36* (2006.01)

(52) U.S. Cl.
CPC ............. *F16H 57/082* (2013.01); *F02C 7/36* (2013.01); *F05D 2260/40311* (2013.01)

(58) Field of Classification Search
None
See application file for complete search history.

(56) References Cited

U.S. PATENT DOCUMENTS

| | | | | |
|---|---|---|---|---|
| 7,448,980 B2* | 11/2008 | Abarquez | ............. | F16H 57/082 475/348 |
| 8,172,717 B2* | 5/2012 | Lopez | .................. | F16H 57/082 475/346 |
| 8,205,432 B2* | 6/2012 | Sheridan | .................. | F02C 7/36 60/226.3 |
| 8,398,525 B2* | 3/2013 | Matsuoka | .................. | F02C 7/36 475/331 |
| 9,745,862 B2* | 8/2017 | Sheridan | .................. | F02C 7/36 |
| 9,874,150 B2* | 1/2018 | McCune | .................. | F02C 7/36 |
| 2006/0252596 A1 | 11/2006 | Abarquez et al. | | |
| 2011/0105270 A1 | 5/2011 | Matsuoka et al. | | |
| 2016/0201509 A1 | 7/2016 | Sheridan | | |
| 2018/0003289 A1 | 1/2018 | Zambon et al. | | |
| 2018/0023483 A1 | 1/2018 | Le Pache et al. | | |

(Continued)

FOREIGN PATENT DOCUMENTS

CN 108167424 A 6/2018
DE 10 2015 222611 A1 6/2016

(Continued)

OTHER PUBLICATIONS

Amended claims in EP19209735A. (Year: 2020).*

(Continued)

*Primary Examiner* — Dirk Wright
(74) *Attorney, Agent, or Firm* — Oliff PLC (57) ABSTRACT

A planet carrier for an epicyclic gearbox, the planet carrier comprising: a single piece carrier body arranged to support a plurality of gears of the epicyclic gearbox; and an opening in a wall of the carrier body; wherein: in a cross-section of the carrier body in a plane that is orthogonal to the longitudinal axis of the carrier body and at a longitudinal position along the carrier body that does not comprise the opening, the carrier body is substantially annular; and the opening is arranged such that the gears that the carrier body is arranged to support can be passed entirely through the opening.

15 Claims, 5 Drawing Sheets

(56) References Cited

U.S. PATENT DOCUMENTS

2019/0331211 A1* 10/2019 Niepceron ............ F16H 57/023
2020/0355123 A1* 11/2020 McCune .................. F16H 1/28

FOREIGN PATENT DOCUMENTS

EP       3 002 433 A1    4/2016
WO    2017/046194 A1    3/2017

OTHER PUBLICATIONS

European Search Opinion in EP19209735A (Year: 2020).*
Search Report of the Intellectual Property Office of the United Kingdom for GB1820399.2 with search date of Jun. 6, 2019.
Feb. 12, 2020 Search Report issued in European Patent Application No. 19 20 9735.

* cited by examiner

PLANET CARRIER AND METHOD OF ASSEMBLING OF A PLANET CARRIER

CROSS-REFERENCE TO RELATED APPLICATIONS

This specification is based upon and claims the benefit of priority from United Kingdom patent application number GB 1820399.2 filed on Dec. 14, 2018, the entire contents of which are incorporated herein by reference.

BACKGROUND

Field of the Disclosure

The present disclosure relates to a planet carrier for an epicyclic gearbox. A new planet carrier is disclosed that allows the gears to be loaded into the planet carrier through a sidewall of the planet carrier whilst retaining a good structural integrity of the planet carrier.

Description of the Related Art

According to a first aspect there is provided a planet carrier for an epicyclic gearbox, the planet carrier comprising: a single piece carrier body arranged to support a plurality of gears of the epicyclic gearbox; and an opening in a wall of the carrier body; wherein: in a cross-section of the carrier body in a plane that is orthogonal to the longitudinal axis of the carrier body and at a longitudinal position along the carrier body that does not comprise the opening, the carrier body is substantially annular; and the opening is arranged such that the gears that the carrier body is arranged to support can be passed entirely through the opening.

In the first aspect the planet carrier may further comprise a cover plate; wherein the cover plate is attachable to the carrier body; and the cover plate is arranged to at least partially close opening when it is attached to the carrier body such that the gears that the carrier body arranged to support cannot be passed entirely through the opening.

In the first aspect the cover plate may be arranged to entirely close opening when it is attached to the carrier body.

In the first aspect, the cover plate may comprise a hole; and the hole may be arranged such that a gear can pass partially, but not entirely, through the hole.

In the first aspect, in a cross-section of the carrier body in a plane that is orthogonal to the longitudinal axis of the carrier body and at a longitudinal position along the carrier body that comprises the opening: the circumferential length of the opening may be such that opening is slightly larger than the largest diameter of gear required to pass through the opening; and the longitudinal length of the opening may be slightly larger than the largest longitudinal length of gear required to pass through the opening.

In the first aspect, there may be a plurality of openings in a wall of the carrier body; and the openings may be arranged such that the gears that the carrier body is arranged to support can be passed entirely through the openings.

According to a second aspect there is provided an epicyclic gearbox component comprising: the planet carrier according to the first aspect; and gears supported by the carrier body; wherein the gears comprise a sun gear and one or more planet gears.

In the second aspect, at least the sun gear may be a double helical gear.

In the second aspect, at least the sun gear may be a herringbone gear.

In the second aspect, there may be three or more planet gears.

According to a third aspect there is provided an epicyclic gearbox comprising the epicyclic gearbox component according to the second aspect, wherein the epicyclic gearbox is arranged in a star, planetary or differential configuration.

According to a fourth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein the gear box comprises an epicyclic gearbox component according to the second aspect and, optionally, the gear box is an epicyclic gearbox according to the third aspect.

In the fourth aspect, the turbine may be a first turbine, the compressor may be a first compressor, and the core shaft may be a first core shaft; the engine core may further comprise a second turbine, a second compressor, and a second core shaft connecting the second turbine to the second compressor; and the second turbine, the second compressor, and the second core shaft may be arranged to rotate at a higher rotational speed than the first core shaft.

According to a fifth aspect there is provided a method of assembling an epicyclic gearbox component according to the second aspect, the method comprising: inserting one or more planet gears into the carrier body through the opening; and after inserting the one or more planet gears into the carrier body, inserting the sun gear into the carrier body through the opening.

The method may further comprise attaching a cover plate to the carrier body so as to entirely, or partially, cover the opening.

The method may further comprise: after inserting the sun gear into the carrier body and before attaching the cover plate to the carrier body, inserting one or more further planet gears into the carrier body through the opening.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, the second compressor, and the second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the corresponding drawings. Other aspects and embodiments will be apparent to those skilled in the art.

Figure 1:
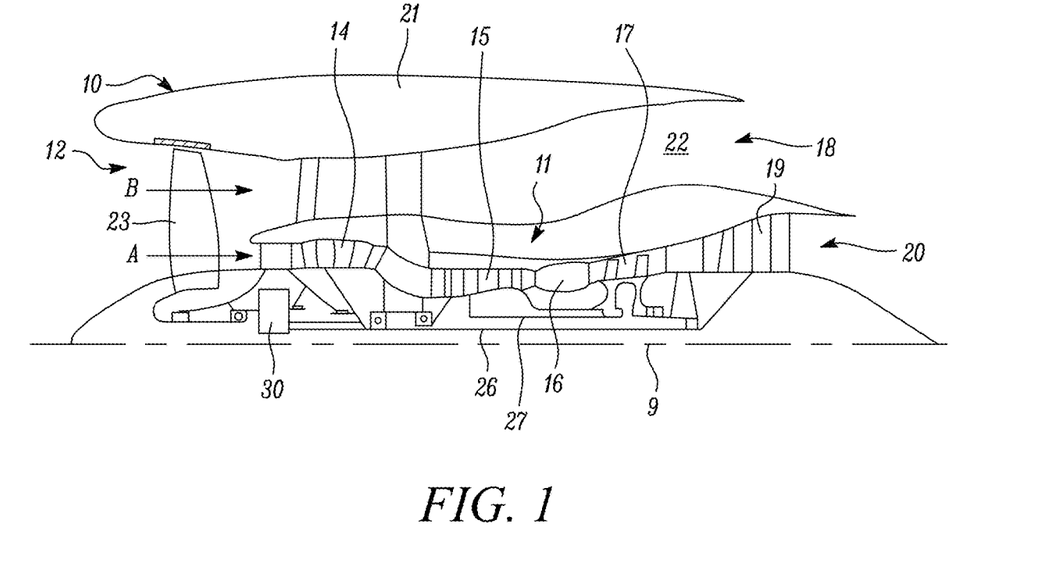
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
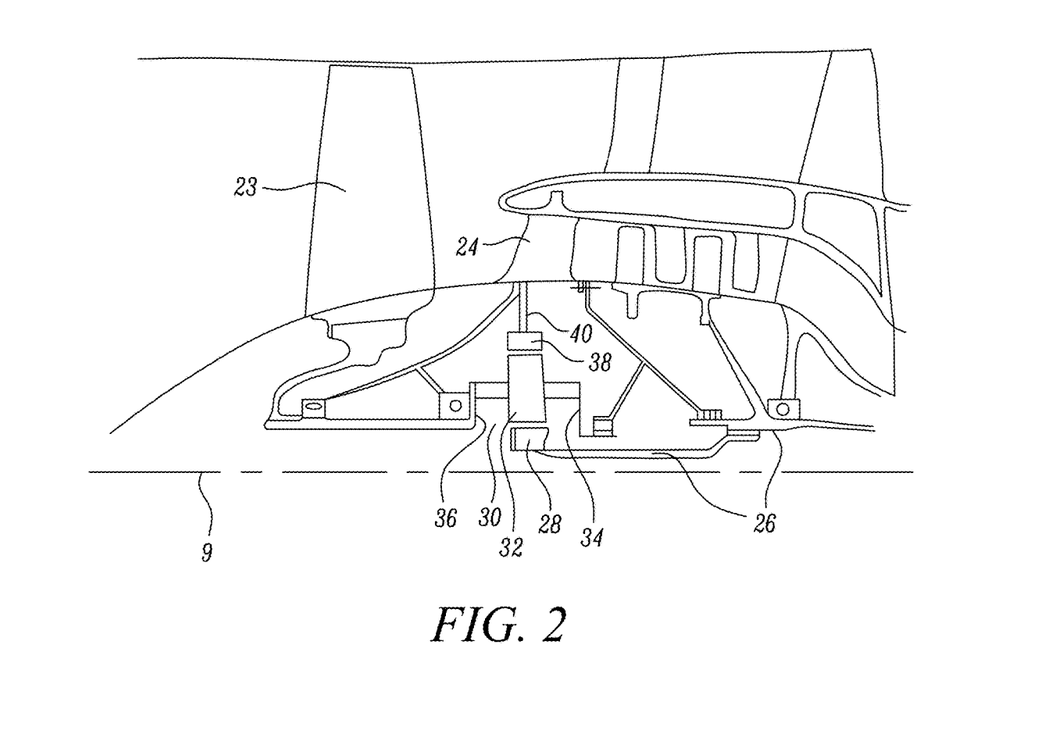
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
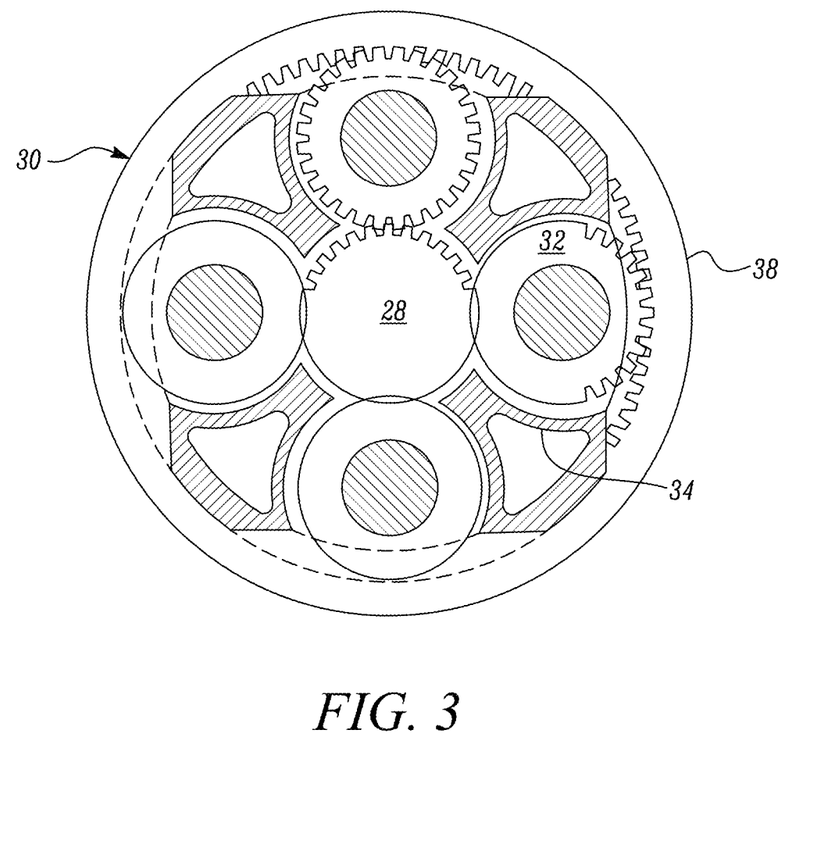
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 3 shows the epicyclic gear box components of a sun gear 28, a plurality of planet gears 32, a planet carrier 34 and a ring gear 38. There are a number of known techniques for assembling a planet carrier with its gears so that the planet gears and sun gear are correctly positioned in the planet carrier. It is known to use a planet carrier that comprises a plurality of parts. However, the multiple parts need to be attached to each other and this increases the manufacturing cost and the attachment points are potential weakness in the planet carrier. Another known technique is to install the gears through the end of the planet carrier. However, this complicates the assembly process if it is difficult to access of the end of the planet carrier. In addition, when the gears are end loaded, it is only possible to mesh the sun gear with the planet gears when the grooves between the teeth of the sun gear and planet gears are all arranged linearly, either in a single helix or parallel to the rotational axis of the sun gear.

Embodiments provide a new planet carrier 34 that allows an improved technique for assembling the planet carrier 34 with its gears.

The planet carrier 34 according to embodiments may comprise a single piece carrier body. The structural integrity of the planet carrier 34 therefore has a good structural integrity even when the planet carrier 34 is made with a large diameter.

The planet carrier 34 has an opening 41 in a wall of the carrier body. The opening 41 is large enough for all of the gears that are supported in the carrier body to be entirely passed through the opening 41.

The shape of the opening 41 may be the same as, and slightly larger than, the outer profile of largest gear out of all of the planet gears 32 and sun gear 28 that are supported in the carrier body. That is to say, in a cross-section of the carrier body in a plane that is orthogonal to the longitudinal axis of the carrier body and at a longitudinal position along the carrier body that comprises the opening 41, the circumferential length of the opening 41 may be such that opening 41 is slightly larger than the largest diameter of gear required to pass through the opening 41; and the longitudinal length of the opening 41 may be slightly larger than the largest longitudinal length of gear required to pass through the opening 41.

The carrier body has a good structural integrity because it is a solid and substantially annular structure along its length except for where the opening 41 is formed. That is to say, in a cross-section of the carrier body in a plane that is orthogonal to the longitudinal axis of the carrier body and at a longitudinal position along the carrier body that does not comprise the opening 41, the carrier body is substantially annular. Any reduction in structural integrity caused by forming the opening 41 in the wall of the carrier body may be minimised by the opening 41 not being substantially larger than what is required for all of the gears to be passed through the opening 41.

Figure 4:
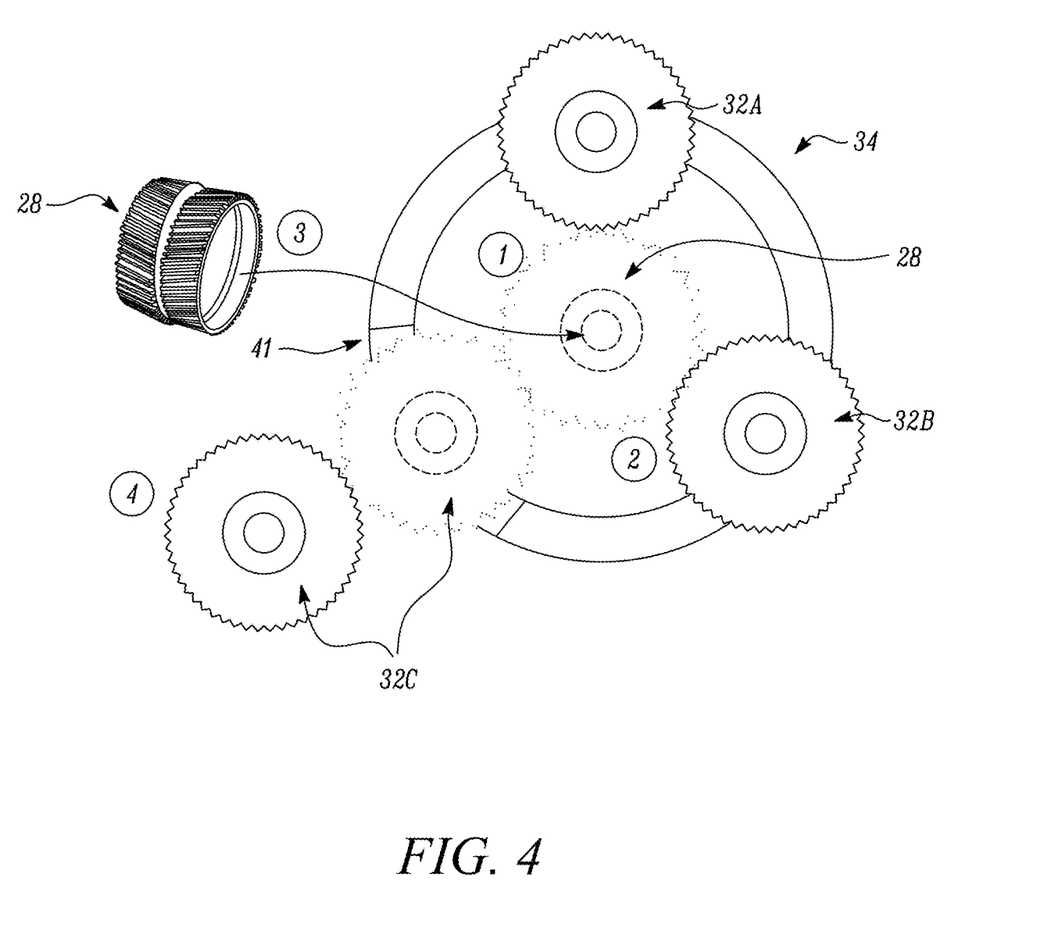
FIG. 4 shows a planet carrier according to an embodiment as well as the insertion of gears into the planet carrier.

FIG. 4 shows a planet carrier 34 according to an embodiment as well as the insertion of gears into the carrier body of the planet carrier.

The planet carrier 34 is being assembled with planet gears 32A, 32B and 32C and well as sun gear 28. To assemble the planet carrier 34 with the planet gears, planet gear 32A is first inserted into the planet carrier 34 through the opening 41 and moved to its intended position in the carrier body. Planet gear 32B is then inserted into the planet carrier 34 through the opening 41 and moved to its intended position in the carrier body. Sun gear 28 is then inserted into the planet carrier 34 through the opening 41 and moved to its intended position in the carrier body. Finally, planet gear 32C is inserted into the planet carrier 34 through the opening 41 and moved to its intended position in the carrier body.

This technique of inserting the gears allows the gears to be easily positioned and meshed together. The gears may have any mesh arrangement. For example, the mesh arrangement may be a double helix. As shown in FIG. 4, the sun gear 28 may be a double helix with helixes the have opposite hands. A gear with such a mesh arrangement may be referred to as a herringbone gear. The side loading of the gears allows a sun gear 28 and planet gears 32 that are herringbone gears to be used. With the known technique of inserting gears via an end of a planet carrier, it is not possible for a sun gear 28 that is a herringbone gear to be inserted into the planet carrier and for the sun gear 28 to be correctly meshed with the planet gears 32.

The carrier body has gaps in its wall that are clearance holes for the planet gears 32. Each clearance hole through which part of a planet gear 32 protrudes is not large enough for the entire planet gear 32 to pass through. In FIG. 4, the opening 41 in the wall of the carrier body has the same location as the clearance hole of the planet gear 32C.

Figure 5:
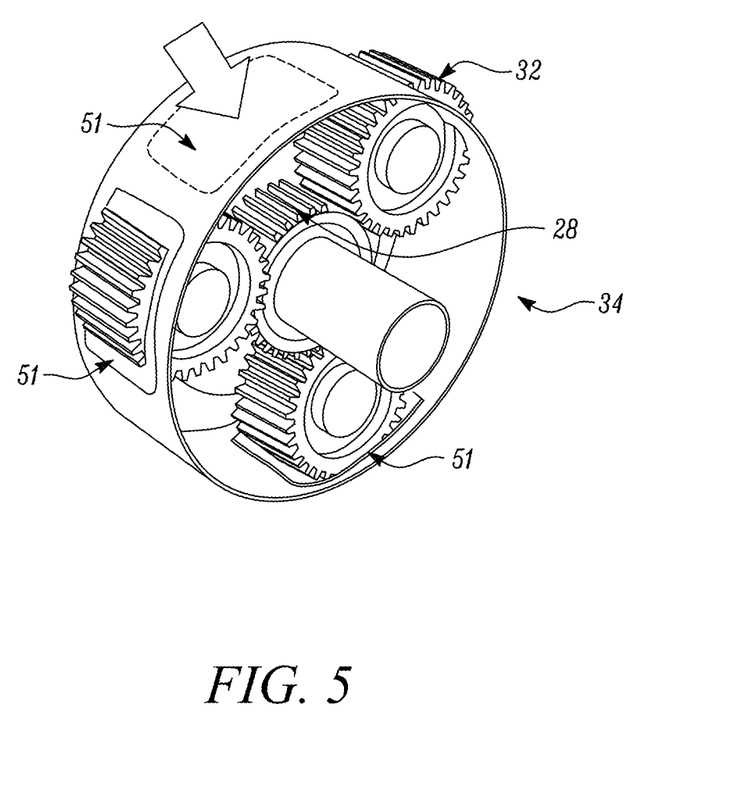
FIG. 5 shows a planet carrier according to an embodiment as well as gears assembled with the planet carrier.

Embodiments also include the opening 41 being separate from the clearance holes required for the planet gears 32. FIG. 5 shows a planet carrier 34 according to another embodiment as well as gears assembled with the planet carrier 34.

The embodiment shown in FIG. 5 shows a plurality of possible locations of the opening 41 in the wall of the carrier body. The opening 41 may be in a different location from the clearance holes through which parts of the planet gears 32 protrude. The opening 41 may alternatively be in the same location as a clearance holes through which parts of the planet gears 32 protrude.

There may be more than one opening 41. By providing more than one opening 41, it is easier to insert all of the planet gears 32 into the planet carrier when there are more than three planet gears. For example, there may be five planet gears 32 and two openings 41. Additionally, or alternatively, the planet carrier 34 may be designed with slightly larger spaces than necessary for supporting each of the planet gears 32. This would allow some axial and/or lateral movement of the planet gears 32 from their intended position in the planet carrier 34 prior to the planet gears 32 being located on their spindles. When inserting the planet gears 32 and sun gear 28 into the planet carrier 34 the additional possible movement of the gears may allow the gears to pass by each other without their teeth clashing and thereby ease the insertion of the gears into the planet carrier. For example, the planet carrier may be assembled with four planet gears 32 and a sun gear 28 and have only one opening 41 with slightly larger spaces than necessary for supporting each of the planet gears 32 being provided.

The planet carrier 34 may also comprise a plate 51 for covering the opening 41. The plate 51 may be attached to the carrier body after all of the gears have been inserted into the carrier body. When the plate 51 is attached the cover may entirely close the opening 41 so that the structural integrity of the planet carrier 34 is improved. When the opening 41 is arranged at the same location as a clearance hole, the plate 51 may only partially close the opening 41 so that the opening 41 is reduced to the size of a clearance hole.

The plate 51 may be removable so that that the gears can be easily accessed for replacement, maintenance and inspection. The plate 51 may be bolted to the carrier body. The plate 51 may be attached to the carrier body by any other means. For example, the plate 51 may be welded to the carrier body.

The plate 51 may be designed such that it has the same stiffness as the circumferential parts of the carrier body to the plate 51.

In embodiments in which there are a plurality of openings 41 in the wall of the carrier body through which the gears can be inserted through, each opening 41 may have its own plate 51 for entirely, or partially, covering the opening 41.

Embodiments also include plate 51 and/or carrier body comprising balancing lands that compensate for any deviations caused by forming the opening 41 in the wall of the carrier body.

Although embodiments have been described with reference to an opening 41, the opening 41 may alternative be considered to be a slot, such as a loading slot, or an access port.

Figure 6:
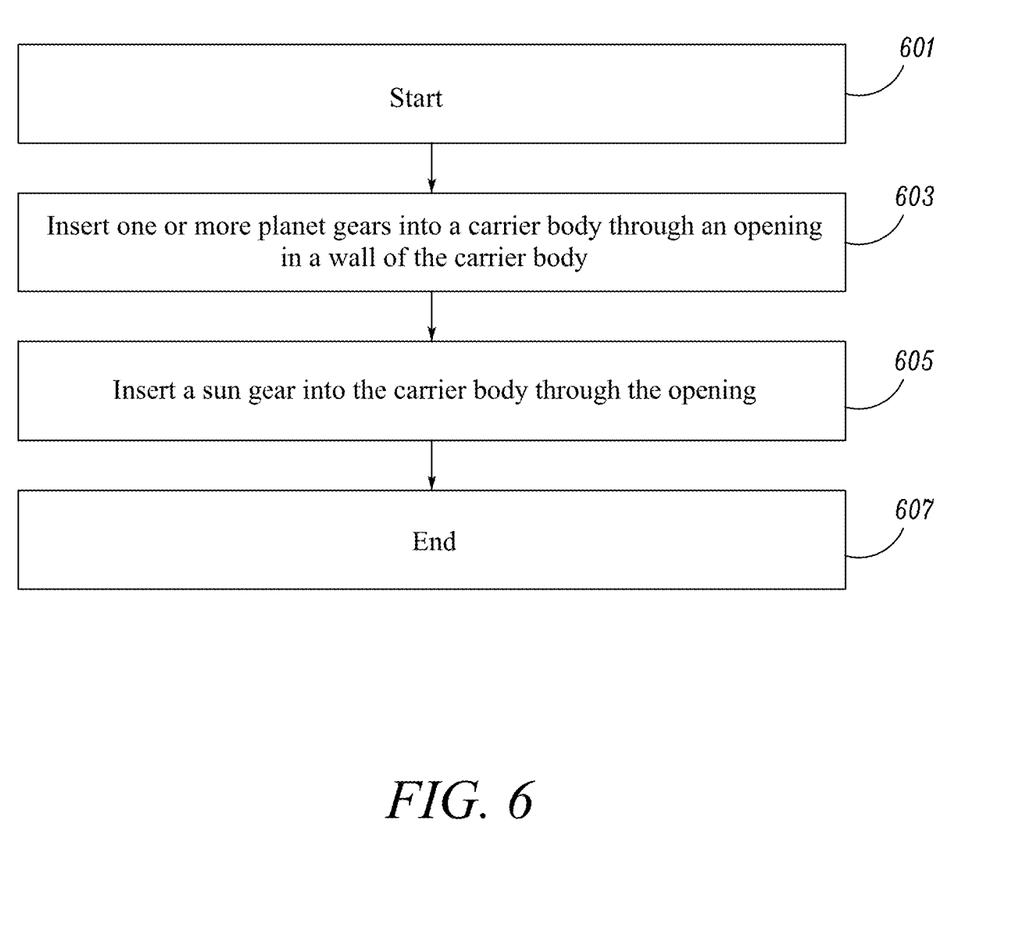
FIG. 6 is a flowchart of a process of assembling an epicyclic gearbox component according to an embodiment.

FIG. 6 is a flowchart of a process of assembling an epicyclic gearbox component according to an embodiment.

In step 601, the process begins.

In step 603, one or more planet gears are inserted into the carrier body through an opening 41 in the carrier body of a planet carrier 34.

In step 605, a sun gear 28 is inserted into the carrier body through the opening 41.

In step 607, the process ends.

Embodiments include a number of modifications and variations to the techniques as described above. In particular, it is not necessary for all of the gears to be inserted into the planet carrier 34 through the opening 41. Some of the gears may be inserted into the planet carrier 34 through the opening 41 and the rest of the gears may be loaded axially. For example, to assemble the planet carrier 34 with the planet gears 32, planet gear 32A may be first inserted into the planet carrier 34 through the opening 41 and moved to its intended position in the carrier body. Planet gear 32B may then be inserted into the planet carrier 34 through the opening 41 and moved to its intended position in the carrier body. Planet gear 32C may then be inserted into the planet carrier 34 through the opening 41 and moved to its intended position in the carrier body. Finally, the sun gear 28 may then be inserted axially into the planet carrier 34. It is possible to insert the sun gear 28 axially when the gears have a linear mesh.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A planet carrier for an epicyclic gearbox, the planet carrier comprising:
   a single piece carrier body arranged to support a plurality of gears of the epicyclic gearbox; and
   an opening in a wall of the single piece carrier body;
   wherein:
   in a cross-section of the single piece carrier body in a plane that is orthogonal to the longitudinal axis of the single piece carrier body and at a longitudinal position along the single piece carrier body that does not comprise the opening, the single piece carrier body is substantially annular; and
   the opening is arranged such that the gears that the single piece carrier body is arranged to support can be passed entirely through the opening and characterized in that the planet carrier further comprises a cover plate;
   wherein the cover plate is attachable to the carrier body; and
   the cover plate is arranged to at least partially close the opening when it is attached to the carrier body such that the gears that the carrier body is arranged to support cannot be passed entirely through the opening.

2. The planet carrier according to claim 1, wherein the cover plate is arranged to entirely close opening when it is attached to the single piece carrier body.

3. The planet carrier according to claim 1, wherein:
   the cover plate comprises a hole; and
   the hole is arranged such that a gear can pass partially, but not entirely, through the hole.

4. The planet carrier according to claim 1, wherein in a cross-section of the single piece carrier body in a plane that is orthogonal to the longitudinal axis of the single piece carrier body and at a longitudinal position along the carrier body that comprises the opening:
   the circumferential length of the opening is such that opening is slightly larger than the largest diameter of gear required to pass through the opening; and the longitudinal length of the opening is slightly larger than the largest longitudinal length of gear required to pass through the opening.

5. The planet carrier according to claim 4, wherein there are a plurality of openings in a wall of the single piece carrier body; and
the openings are arranged such that the gears that the single piece carrier body is arranged to support can be passed entirely through the openings.

6. An epicyclic gearbox component comprising:
a planet carrier according to claim 4; and
gears supported by the single piece carrier body of the planet carrier;
wherein the gears comprise a sun gear and one or more planet gears.

7. The epicyclic gearbox component according to claim 6, wherein at least the sun gear is a double helical gear.

8. The epicyclic gearbox component according to claim 7, wherein at least the sun gear is a herringbone gear.

9. The epicyclic gearbox component according to claim 6, wherein there are three or more planet gears.

10. An epicyclic gearbox comprising the epicyclic gearbox component according to claim 6, wherein the epicyclic gearbox is arranged in a star, planetary or differential configuration.

11. A gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein the gear box comprises an epicyclic gearbox component according to claim 6 and, optionally, the gear box is an epicyclic gearbox arranged in a star, planetary or differential configuration.

12. The gas turbine engine according to claim 11, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, the second compressor, and the second core shaft are arranged to rotate at a higher rotational speed than the first core shaft.

13. A method of assembling an epicyclic gearbox component according to claim 6, the method comprising:
inserting one or more planet gears into the single piece carrier body through the opening; and
after inserting the one or more planet gears into the single piece carrier body, inserting the sun gear into the single piece carrier body through the opening.

14. The method according to claim 13, further comprising attaching a cover plate to the single piece carrier body so as to entirely, or partially, cover the opening.

15. The method according to claim 14, further comprising:
after inserting the sun gear into the carrier body and before attaching the cover plate to the carrier body, inserting one or more further planet gears into the carrier body through the opening.

* * * * *